PHOTOGRAPHIC APPARATUS

Original Filed Dec. 4, 1962

INVENTOR.
Edwin H. Land
BY Brown and Mikulka
and
Robert E. Cord
ATTORNEYS

United States Patent Office

Re. 26,324
Reissued Dec. 19, 1967

26,324
PHOTOGRAPHIC APPARATUS

Edwin H. Land, Cambridge, Mass., assignor to Polaroid Corporation, Cambridge, Mass., a corporation of Delaware Original No. 3,194,138, dated July 13, 1965, Ser. No. 242,271, Dec. 4, 1962. Application for reissue July 13, 1966, Ser. No. 569,769
9 Claims. (Cl. 95—13)

Matter enclosed in heavy brackets [ ] appears in the original patent but forms no part of this reissue specification; matter printed in italics indicates the additions made by reissue.

This invention relates to photographic apparatus and more particularly to apparatus for exposing and processing photosensitive image-recording sheet materials to produce photographic prints.

The present invention is specifically concerned with apparatus for treating an exposed image-recording sheet with a liquid by a process generally described as "dry" because the liquid is confined between the image-recording sheet and another sheet superposed therewith and does not contact the outer surfaces of the sheets or components of the apparatus whose function it is to manipulate the sheets. Heretofore, it has been the practice, in treating an exposed image-recording material, such as a gelatino silver halide emulsion, with an aqueous alkaline fluid including a silver halide developer, to include a thickening agent in the fluid and distributing the viscous fluid between a pair of superposed sheets by advancing the sheets between a pair of pressure-applying members. While such systems have proved more than satisfactory as evidenced by the so-called "Land" system of photography, the use of a viscous liquid has presented problems relating to the provision of the liquid between the sheets; while the pressure-applying members, provided for distributing the liquid, may represent a substantial portion of the cost of apparatus such as a camera incorporating them.

These considerations, coupled with the discovery that certain photographic processes can be performed more rapidly and with improved results if the image-recording material is treated with an aqueous alkaline liquid having a viscosity substantially that of water, have led to the present invention which has, as an object, the provision of novel and improved photographic apparatus for exposing successive areas of a photosensitive image-recording sheet and treating each of said areas with a liquid having a viscosity of the order of the viscosity of water.

Another object of the invention is to provide photographic apparatus of the type described in which a nonviscous liquid is confined to a closed reservoir, an applicator and those surfaces of sheet materials to be treated with the liquid.

A further object of the invention is to provide photographic apparatus of the type described especially adapted for intermittently treating successive areas of an image-recording sheet with an aqueous alkaline liquid contained within the apparatus and having a substantially high pH.

Other objects of the invention will in part be obvious and will in part appear hereinafter.

The invention accordingly comprises the apparatus possessing the construction, combination of elements and arrangement of parts, which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figure 1:
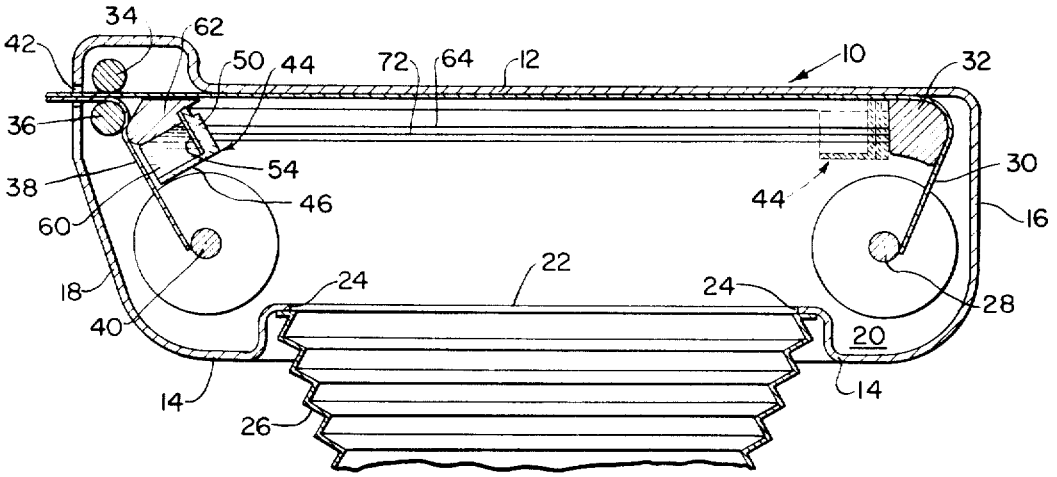
FIGURE 1 is a fragmentary, sectional view of photographic apparatus in the form of a camera embodying the invention, the section being taken substantially midway between the sides of the camera.

Apparatus of the type with which the present invention is concerned generally include cameras which are employed manually to expose and process a photosensitive image-recording sheet to produce a finished photographic print by a diffusion-transfer process. As previously noted, it has been the practice to process the image-recording sheet by providing a mass of a viscous liquid between the image-recording sheet and another sheet which may function as a support for a positive-transfer print, superpose the two sheets, and distribute the viscous liquid by advancing the sheets in superposition relative to and between a pair of pressure-applying members. The liquid is rendered viscous by a thickening agent in order to facilitate distribution or spreading of the liquid in a layer between the sheets and to help confine the liquid between the sheets. Such practices also require the collection and retention of any excess processing liquid especially when the liquid is distributed between the sheets for the primary purpose of wetting one or both of the sheets rather than forming a layer having utility in itself. The processing liquids employed usually include a developing agent, are alkaline and have a relatively high pH, in many instances of the order of 12 to 14. Not only are such liquids highly corrosive and likely to damage metal components of apparatus with which they come into contact, but if the pH of the liquid is to be maintained, the liquid must be protected from the atmosphere, particularly the carbon dioxide thereof. It has been recognized that a considerable savings in both cost and complexity of the apparatus and the photographic materials employed therein could be achieved if it were not necessary to supply, distribute, collect and retain a viscous processing liquid.

One of the processes performed by this type of apparatus involves the exposure of a photosensitive image-recording element and the subsequent treatment of the element to produce a transfer image in color. The image-recording element is in the form of a multilayer sheet such as disclosed in U.S. Patent No. 2,983,606, issued May 9, 1961, in the name of Howard G. Rogers. This type of photosensitive element is photoexposed to form a latent image and is then treated in conjunction with a print-receiving layer or element by an aqueous liquid including sodium hydroxide to form a diffusion-transfer image in terms of a dye or dyes on the image-receiving element. It has been discovered that a process such as this proceeds more rapidly and produces better quality transfer images if a thickening agent (such as hydroxyethyl cellulose) is not added to the liquid and the liquid has a viscosity of the order of that of water. In this process, the liquid is applied so as to be absorbed or imbibed into the photosensitive element, including the image-recording material thereof, and/or the image-receiving element, and the two elements are then pressed against one another and retained in this position for a predetermined period during which the formation of a dye transfer image occurs. The nonviscous processing liquid is imbibed into only that side of the element which is superposed with the other element, and the amount of liquid required for the treatment of an exposed area of the photosensitive element is very small, for example, of the order of a small fraction of a cubic centimeter for an area of about 12 sq. inches.

The present invention resides in novel and improved apparatus for causing a small, uniformly distributed and accurately predetermined amount of a nonviscous, aqueous alkaline liquid to coat one side of a photographic sheet particularly a multicolor negative. The apparatus is designed to contain sufficient liquid for a plurality of exposed areas of the multicolor negative and to imbibe the liquid into each of the areas individually and at indeterminate intervals.

Reference is now made to FIGURE 1 of the drawings wherein such apparatus is illustrated in the form of a camera adapted to be held and operated manually. This camera comprises a housing 10 having a rear wall 12 and a forward wall 14 joined by end walls 16 and 18 and side walls 20. Forward wall 14 includes a recessed re-entrant section 22 provided with an aperture 24 through which light can be admitted to the housing for exposing photosensitive materials positioned therein. The camera may include suitable exposure means such as a conventional lens and shutter device (not shown) and a bellows 26 secured at one end to recessed section 22 and providing a light path between the lens and shutter device and the housing.

A supply of photosensitive image-recording sheet material such as disclosed in the aforementioned Rogers' patent and sufficiently large to provide a plurality of exposure areas is provided coiled on a spool 28 mounted within the camera housing adjacent end wall 16. The image-recording sheet, designated 30, is an essentially plain sheet without masks, containers, holes, indexing or liquid-trapping elements adhered thereto or formed therein as is sometimes the case in construction in which the film is to be treated with a viscous liquid. Image-recording sheet 30 is guided from spool 28 around a guide member 32 into contact with the inside of rear wall 12 toward the opposite end of the camera housing. The rear wall, in the embodiment shown, serves to support an area of the photosensitive sheet in position for exposure to light transmitted through aperture 24 from an exposure means.

The processing accomplished by the camera shown involves the superpositioning of each exposed area of the photosensitive sheet with a corresponding area of a second or image-receiving sheet. For this purpose, there are provided a pair of rolls 34 and 36 mounted at the rear of the camera adjacent end wall 18. The construction and mounting of rolls 34 and 36 is quite simple and much less complicated than would be the case if the rolls were required to distribute a viscous processing liquid between the sheets since the rolls shown are required only to press the sheets into contact with one another. Accordingly, the rolls may be mounted in fixed position with respect to one another and are provided with a surface of a pliant or elastomeric material which is adapted to increase the friction between the rolls and sheets.

A supply of a second or image-receiving sheet 38 is provided coiled on a spool 40 mounted within forward portion of the housing adjacent end wall 18. Second sheet 38 is also unadorned with masks, liquid-trapping elements, indexing elements and the like commonly associated with such sheets and, like the image-recording sheet, is less expensive to manufacture and assemble. Second sheet 38 is guided from spool 40 into superposition with image-recording sheet 30 between rolls 34 and 36. The two sheets are advanced as they are superposed directly from and between rolls 34 and 36 from the camera housing through a slot 42 formed in end wall 18 in alignment with the gap between rolls 34 and 36. In this regard, the photosensitive material of image-recording sheet 30 may remain light sensitive during a portion of the processing period during which the two sheets are retained in superposition and, accordingly, each of the sheets includes a support which is either opaque to actinic light or is provided with an opaque coating located exterior of the photosensitive materials when the two sheets are superposed.

The invention includes a device within the housing for storing sufficient processing liquid to treat a plurality of areas of the image-recording sheet and for applying a predetermined quantity of this liquid to the image-recording sheet so that the liquid is imbibed or absorbed uniformly therein prior to pressing the image-receiving sheet into face-to-face contact with the moistened image-recording sheet. In the form shown, this liquid storing and applying device is designated 44 and generally comprises a reservoir for the liquid and means for applying the liquid to the sheets. Device 44 may comprise either a permanent or semipermanent component of the apparatus or a disposable element containing sufficient liquid to treat a predetermined number of areas of a negative material. The device shown in detail in FIG. 2 includes a member having a generally rectangular base 46, two upstanding end walls 48 and an outer side wall 50 extending along one side between end walls 48 and including an edge section 52. The inner surface of side wall 50 and edge section 52 is substantially smooth and planar and approximately equal in length to the width of the area of the image-recording sheet to be treated. An inner side wall 54 having a similar smooth, plane surface is mounted between end walls 48 with its plane surface disposed parallel with and closely adjacent the plane inner surface of wall 50. The adjacent surfaces of walls 50 and 54 are so located with respect to one another as to form an interspace or passage 56 of capillary depth or thickness of the order .001 to .005 inch depending on the physical properties of the liquid being employed and the quantity of said liquid to be imbibed into each exposed area of the image-recording sheet. Edge section 52 and inner side wall 54 terminate in substantially straight longitudinal edge surfaces which are substantially coplanar and define one edge of capillary interspace 56. The opposite end of the capillary interspace or passage communicates with a reservoir, one wall of which comprises base 46; and the capillary interspace extends between side walls 50 and 54 and between the latter and base 46.

In an alternative embodiment either or both of the facing surfaces defining the walls of the capillary interspace may be formed with minute grooves or channels extending in the desired direction of flow of liquid through the interspace. In this embodiment side wall 50 and inner side wall 54 are assembled together to form a multiplicity of contiguous or closely adjacent capillaries each defined by a channel or groove and in aggregate functioning in much the same way as the single capillary interspace shown.

The reservoir for the processing liquid is provided by a thin flexible air- and water-impervious sheet or membrance 58 secured to end walls 48, base 46, and inner side wall 54 to form a chamber designated 60 for containing the processing liquid. The processing liquid is conducted from chamber 60 through capillary interspace 56 to the outer edge thereof by capillary action which requires that the liquid in chamber 60 be maintained at ambient pressure. This is accomplished by providing sheet 58 of a very thin flexible material and attaching sheet 58 to base 46, end walls 48 and side wall 54 in such a way that the portion of the chamber defined by sheet 58 will transmit ambient pressure to the liquid collapsing as the liquid is withdrawn from the chamber. While a simpler method of maintaining the liquid in the chamber at ambient pressure might be to admit air to the chamber, it is undesirable because it is important that carbon dioxide be excluded from the liquid if the pH (high) of the liquid is to be maintained.

Alternatively the capillary interspace itself may be designed to function as the reservoir for the processing liquid and would be constructed of a size and volume sufficient to contain the desired quantity of processing liquid. A reservoir in the form of a capillary or multiplicity of capillaries may take a number of forms particularly forms in which the capillary is bent, folded or otherwise shaped so as to minimize the space required.

The liquid contained in chamber 60 is applied to image-recording sheet 30 by positioning the longitudinal edges of edge section 52 and inner side wall 54 at the edge of interspace 56 in contact with the image-recording sheet and moving the sheet and device 44 relative to one another. In the camera shown, device 44 is moved relative to and in contact with the area of sheet 30 supported in position for exposure on the inner surface of rear wall 12, and the image-recording element remains stationary during movement of device 44 and application of the processing liquid. In order that the liquid be conducted without interruption to the sheet from the reservoir by capillary action, the opposite end of the capillary interspace should be immersed at all times in the liquid, and to insure this condition, the camera is oriented during application of the liquid with rear wall 12 disposed uppermost. In this position of the camera, any liquid in the reservoir will be conducted into the capillary interspace and conduction of the liquid to the sheets will be by capillary action and not by gravity flow.

In order to provide for exposure of a maximum length of image-recording sheet 30 in the smallest and most compact apparatus, provision is made for locating device 44 at one end and to the side of the area to be exposed, this location being the same for each successive exposure. In the apparatus shown, device 44 is disposed out of contact with sheet 30 at the end of the housing adjacent wall 18 between spool 40 and rolls 34 and 36. The device is supported in this position by a member 62 which functions to guide sheet 38 from spool 40 to roll 36 and to engage the longitudinal edges of edge section 52 and inner side wall 54 at capillary interspace 56 to close the interspace and thereby prevent the flow of liquid from the interspace and/or evaporation of the liquid contained therein between coating operations. A capillary provides the added advantage of being relatively easy to seal, and the portion of member 62 which engages device 44 for this purpose may be formed of a pliant material, such as an elastomer, to facilitate sealing of the capillary. Following exposure of an area of photosensitive sheet 30 supported on rear wall 12, device 44 is moved rearwardly into contact with sheet 30 adjacent the edge of the area thereof closest member 62 and is moved with the longitudinal edges of section 52 and inner side wall 54 in contact with the sheet toward guide member 32 to the position shown by broken lines in FIGURE 1. Sheet 30 is then advanced through the camera between rolls 34 and 36 to superpose the exposed and moistened area of the sheet with an area of sheet 38. At the same time the sheet is advanced, thereby moving the next successive area of sheet 30 into position for exposure, device 44 is moved along with the sheet into its initial position shown in FIGURE 1 between spool 40 and member 62 at which the capillary interspace is closed against the flow of the processing liquid.

Figure 3:
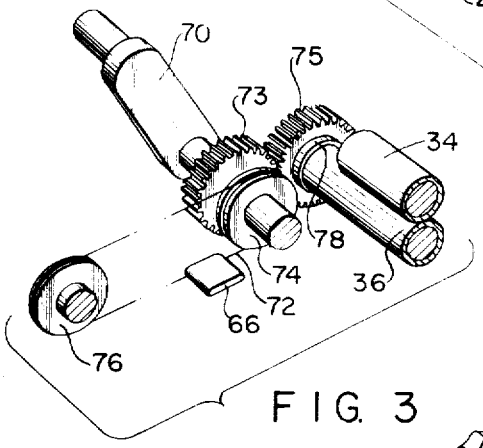
FIG. 3 is a fragmentary perspective view partially in section illustrating other components of the apparatus.

The means for advancing and superposing the sheets, moving the device into and from engagement with image-recording sheet 30 and moving the device relative to the image-recording sheet in order to apply the liquid thereto, are illustrated in FIGS. 1 and 3 and comprise a channel or tracks 64 in each side of the camera housing for containing support members 66 slidably engaged in the channels. Each of channels 64 extends from guide member 32 substantially parallel with rear wall 12 toward end wall 18 where it curves away from the end wall and serves to guide a support member 66 along a path parallel with rear wall 12 and then diverging from the rear wall. Device 44 is supported on and between members 66 and is moved thereby as described. Engagement of device 44 with members 66 is achieved by providing end walls 48 with recesses 68 for receiving members 66.

The sheets are moved through the apparatus and members 66 are moved within channels 64 by means in the form of a manually engageable crank 70 connected through gears 73 and 75 to roll 36. As a means for translating members 66 in both directions, there is provided an endless belt or element 72 extending between and around a drive pulley 74 and an idler pulley 76 located at opposite ends of each of channels 64. Each of support members 66 is connected to an endless belt 72 so that rotation of drive pulley 74 is effective to advance support members 66 from one end of channel 64 to the other depending on the direction of rotation of pulley 74. In the operation of the camera, to process an exposed area of sheet 30 following exposure thereof, crank 70 is rotated in a clockwise direction, viewing FIG. 3, to move device 44 from the initial position shown in FIGURE 1 in engagement with member 62 to the position shown by broken lines in FIGURE 1 at the opposite end of the exposed area adjacent guide member 32. Gear 75 is connected to roll 36 through an overrunning clutch 78 so that roll 36 remains stationary and does not rotate during the clockwise rotation of crank 70 and pulley 74, which results in the movement of device 44 toward guide member 32. When the device reaches this latter position and comes to a stop, crank 70 is then rotated in the opposite (counterclockwise) direction thereby moving device 44 toward its initial position and, at the same time, rotating roll 36 to advance sheet 30 in the same direction between rolls 34 and 36. The gearing arrangement and the diameters of pulley 74 and roll 36 are preferably such that the device and sheet move at the same linear speed so that the processing liquid is not applied to previously moistened areas of the image-recording sheet or to unexposed portions thereof. It is apparent that an additional length of the image-recording sheet must be advanced between rolls 34 and 36 after movement of device 44 has ceased, in order to advance the exposed and moistened area of the image-recording sheet from the camera through slot 42. This is accomplished by continuing the counterclockwise rotation of crank 70 after movement of device 44 has ceased and, for this purpose, pulley 74 is connected to crank 70 through a slip clutch or other form of transmission which permits the crank to be rotated without rotating drive pulley 74.

It will be noted that the moistened surface of the exposed area of the image-recording sheet is prevented from contacting anything but the image-recording sheet between rolls 34 and 36. Provision may be made in the camera for clamping the image-recording sheet intermediate the leading edge of the exposure area and rolls 34 and 36 during exposure in order to help retain the sheet against rear wall 12 in position for exposure. During and intermediate exposures except when device 44 is in motion, capillary interspace 56 is closed so that the camera need not be oriented in any special position in order to prevent escape of the processing liquid.

Figure 2:
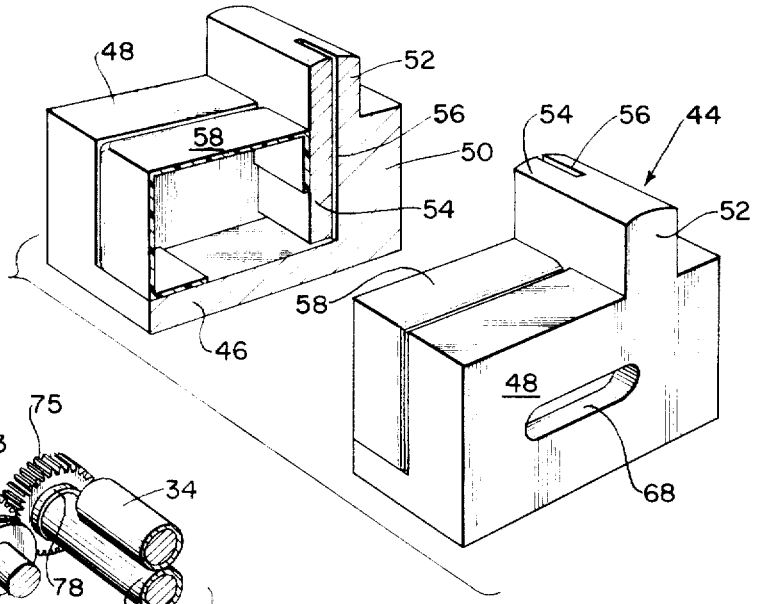
FIG. 2 is a perspective view partially in section of a component of the apparatus of FIGURE 1.
Figure 4:
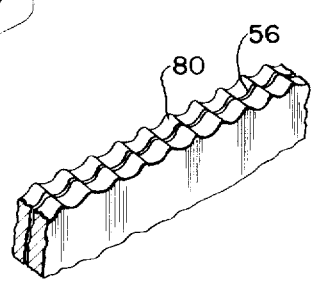
FIG. 4 is a fragmentary perspective view illustrating another embodiment of the apparatus of FIG. 2.

The surfaces of the longitudinal edge portions of edge section 52 and inner side wall 54 which contact the image-recording sheet are shown in FIG. 2 as being curved convexly, e.g., cylindrical, and smooth. This construction is intended to facilitate absorption of the liquid directly from capillary interspace 56 into the photosensitive layer of sheet 30. However, other configurations of these contact surfaces are possible including, for example, planar surfaces which may result in the formation of a capilliary between the contact of surface and sheet 30 which capillary is a continuation of capillary interspace 56 and functions to conduct the liquid from capillary interspace 56 into contact with the sheet. Another embodiment of these surfaces designed to facilitate flow and distribution of the liquid from the capillary interspace onto the surface of sheet 30 is shown in FIG. 4. In this embodiment the longitudinal contact surfaces are generally straight and may be cylindrical in cross section (taken in a plane parallel with the direction of movement of device 44) and are formed with minute serrations 80 which cooperate with the surface of sheet 30 to form capillaries extending in the direction of movement of device 44 and functioning to conduct the liquid from the interspace between sheet 30 and the longitudinal surfaces of edge section 52 and inner side wall 54.

While the preferred embodiment of the invention has been shown as constructed for moving the liquid applicator relative to a stationary sheet and returning the liquid applicator to an initial position following each successive liquid applying operation, it is possible within the scope of the invention, to hold the liquid applicator stationary and move the image-recording sheet relative to the applicator in order to moisten the sheet during withdrawal movement of the sheet. In such an embodiment, provision would still be required for closing the capillary interspace between coating operations even though disengagement of the applicator from the sheet might be unnecessary since it is conceivable that the sheet itself might function to close the capillary interspace between coating operations.

In still another embodiment, the applicator might be located in its initial position adjacent the trailing edge of the exposed area and reciprocated in contact with the image-recording sheet to apply the liquid thereto. In this embodiment the liquid may be applied during movement of the applicator in both directions, thus making it possible to apply and imbibe a greater amount of liquid with a fixed depth capillary interspace. An alternative embodiment capable of applying a larger amount of liquid may comprise a plurality of capillaries similar to capillary 56 all formed as a part of device 44 and communicating with reservoir 60. This construction makes it possible to apply liquid from two or more capillaries simultaneously and during a single movement of device 44 across the exposed area of the image-recording sheet.

The apparatus of the invention provides for the moistening of successive exposed areas of a photosensitive image-recording sheet with a nonviscous, aqueous, alkaline liquid within a hand-operated camera. The process, even though it involves a free flowing liquid, is essentially dry, the pH of the liquid is maintained and the camera, except during actual moistening of the image-recording sheet, can be employed in any position desired without danger of spilling or wasting the liquid. The sheet materials employed are substantially plain, unadorned webs requiring no masks, traps, containers, holes, notches or other like arrangements for providing the processing liquid, controlling the distribution of the processing liquid, trapping and retaining the processing liquid or controlling the advancement of the sheets through the apparatus. In fact, each of the sheets, following its manufacture, needs only to be spooled in order to prepare it for loading into the camera. The apparatus, insofar as the superpositioning of the sheets is concerned, is quite simple and requires none of the more complex and expensive fluid-spreading devices heretofore incorporated in this type of camera.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. In photographic apparatus for exposing successive areas of [a] photosensitive image-recording sheet *material,* means for treating said areas of said image-recording sheet with a processing liquid comprising, in combination:

a liquid applicator including a member having two surfaces disposed in adjacent face-to-face relation and defining a capillary interspace between said surfaces;

said surfaces and said capillary interspace defined thereby terminating in an edge defined by edge portions of said member;

a reservoir for said processing liquid constructed to maintain the liquid contents of said reservoir substantially at ambient pressure;

said member being positioned with the end of said capillary interspace opposite said edge immersed in said liquid within said reservoir;

means for supporting said member within said apparatus with said edge portions thereof defining said edge of said interspace in contact with said image-recording sheet and moving said member and said sheet relative to one another to apply said liquid to said sheet from said capillary interspace;

the last-named means including means for moving said applicator and said reservoir from a first to a second position to apply said liquid to said sheet; and means for engaging said edge portions of said member at said first position for closing said capillary interspace against the flow of said liquid.

2. In photographic apparatus for exposing successive areas of [a] photosensitive image-recording sheet *material,* means for supporting said [successive] areas in position for exposure and means for treating said areas with a processing liquid, the last-mentioned means comprising, in combination:

a liquid applicator including a member having two surfaces disposed in adjacent face-to-face relation and defining a capillary interspace between said surfaces;

said surfaces and said capillary interspace defined thereby terminating in an edge defined by edge portions of said member;

a reservoir for said processing liquid constructed to maintain the liquid contents of said reservoir substantially at ambient pressure;

said member being positioned with the end of said capillary interspace opposite said edge immersed in said liquid within said reservoir;

means for supporting said member within said apparatus with said edge portions thereof defining said edge of said interspace in contact with said image-recording sheet and moving said member and said sheet relative to one another to apply said liquid to said sheet from said capillary interspace; and the last-named means including means for moving said liquid applicator and said reservoir in one direction from a first position at one side of said area of said image-recording sheet positioned for exposure, across said area to a second position at the opposite side of said area for applying said liquid to said area of said sheet, and means for moving said applicator and said area together in the opposite direction to return said applicator to said first position and locate the next succeeding area of said image-recording sheet in position for exposure.

3. The photographic apparatus of claim 2 in which there are provided means for disengaging said member from said sheet when said applicator is in said first position; and means for engaging said member at said edge portions for closing said capillary interspace against the flow of said liquid therefrom when said applicator is in said first position.

4. The photographic apparatus of claim 2 in which the last-mentioned means comprise means for pressing said image-recording sheet into superposition with a second sheet.

5. In a [camera] *photographic apparatus* for exposing successive areas of [a] photosensitive image-recording sheet *material,* means for treating said areas of said image-recording sheet with a processing liquid comprising, in combination:

a liquid applicator including two adjacent walls having surfaces disposed in adjacent face-to-face relation and defining a capillary interspace between said surfaces having a width substantially equal to the width of said areas to be treated;

a reservoir for said processing liquid constructed to maintain the liquid contents of said reservoir substantially at ambient pressure;

said walls including adjacent substantially parallel edges defining one end of said capillary interspace and being disposed with the other end of said capillary interspace in communication with said reservoir and said surfaces in contact with said liquid within said reservoir;

means supporting said applicator and said reservoir within said camera with said edges of said walls at said one end of said capillary interspace in contact with said image-recording sheet; and transport means for [moving] *effecting movement of* said applicator and said reservoir relative to said image-recording sheet lengthwise of an area thereof with said edges in contact with said image-recording sheet and said capillary interspace disposed transversely of the direction of *relative* movement of said applicator *and said sheet* to dispense said liquid from said capillary interspace in contact with said area of said sheet.

6. The [camera] *photographic apparatus* of claim 5 in which said edges of said walls defining said one end of said capillary interspace are serrated to permit the flow of said liquid from said capillary interspace between said edges of said walls and said sheet.

7. [A camera] *photographic apparatus* as defined in claim 5 including means for guiding successive portions, each including one of said areas, of said sheet into position for exposure and holding each of said portions stationary in exposure position during exposure and movement of said applicator relative to said one area to apply said liquid thereto, and means for superposing said portions with another sheet during movement of said portions from exposure position; said transport means moving said applicator in contact with said each portion from adjacent one edge of said area thereof to the opposite edge of said area.

8. The photographic apparatus of claim 5 in which said reservoir is enclosed by a thin, flexible sheet material which is substantially impervious to air and said liquid and is constructed and arranged to collapse readily and substantially completely so as to exert ambient pressure on said liquid within said reservoir regardless of the amount of said liquid.

9. In photographic apparatus for exposing successive areas of [a] photosensitive image-recording sheet *material,* means for treating said areas of said image-recording sheet with a processing liquid comprising, in combination:

a liquid applicator including a member having two surfaces disposed in adjacent face-to-face relation and defining a capillary interspace between said surfaces;

said surfaces and said capillary interspace defined thereby terminating in an edge defined by edge portions of said member;

a reservoir for said processing liquid constructed to maintain the liquid contents of said reservoir substantially at ambient pressure;

said member being positioned with the end of said capillary interspace opposite said edge immersed in said liquid within said reservoir;

means for supporting said member within said apparatus with said edge portions thereof defining said edge of said interspace in contact with said image-recording sheet and moving said member and said sheet relative to one another to apply said liquid to said sheet from said capillary interspace;

means for supporting an area of said image-recording sheet in position for exposure;

means for moving said applicator and said reservoir between positions at opposite sides of said area of said image-recording sheet positioned for exposure for applying said liquid to said area;

means for disengaging said member from said sheet at each of said positions; and means for engaging said edge portions of said member at each of said positions for closing said capillary interspace against the flow of said liquid.

References Cited

The following references, cited by the Examiner, are of record in the patented file of this patent or the original patent.

UNITED STATES PATENTS

| | | | |
|---|---|---|---|
| 1,057,712 | 4/1913 | Crompton | 95—89 |
| 2,548,573 | 4/1951 | Wampole | 95—94 |
| 2,558,858 | 7/1951 | Land | 95—13 |
| 3,097,584 | 7/1963 | Wright | 95—94 X |

JOHN M. HORAN, *Primary Examiner.*